United States Patent Office 3,314,831
Patented Apr. 18, 1967

3,314,831
HEAT TREATMENT FOR PRECIPITATION-HARDENING STEELS
Arthur F. Hoenie and Richard M. Potter, Columbus, Ohio, assignors to North American Aviation, Inc.
No Drawing. Filed Oct. 26, 1961, Ser. No. 147,768
6 Claims. (Cl. 148—125)

This invention concerns a heat treatment for developing improved mechanical properties and performance characteristics in precipitation-hardening steels.

Precipitation-hardening steels or alloys, also sometimes referred to generally as corrosion-resistant steels or semiaustenitic stainless steels, have recently received considerable attention as having possible application to the manufacture of structural components for high-performance aircraft. From the standpoint of tensile strength, yield strength, resistance to corrosion, and hardenability, such alloys have been established as highly desirable when considered for use to meet the structural performance requirements of many aircraft components. Such is particularly true as to applications relating to high-performance aircraft, especially air vehicles capable of operating throughout sustained periods of time at flight values of Mach 3.0 and better. However, precipitation-hardening steels preferred for high-performance aircraft application have demonstrated marginal acceptability and sometimes are totally deficient when measured on the basis of dimensional stability. The matter of marginal acceptability also has a relation to other mechanical properties and to other performance characteristics such as machinability and resistance to corrosion caused by intermediate manufacturing operations.

We have discovered that precipitation-hardening steels preferred for aircraft structural component part application may be processed to develop improved properties and characteristics such as transverse ductility, machinability, dimensional stability, and resistance to corrosion in intermediate manufacturing operations by practice of the heat treatment of our invention thereby leading to the production of acceptable aircraft precipitation-hardening steel structural components. Basically, the heat treatment of our invention employs operations which are in addition to the high-temperature annealing steps of conventional precipitation-hardening alloy heat treatments and which are in addition to the process anneal, transformation, and aging steps of the conventional heat treatment; our invention notably differs from the prior art in the incorporation of a stabilization operation between such groupings of steps. Precipitation-hardening steel component parts treated in accordance with our invention thereby acquire the desired optimum final properties and characteristics. If other manufacturing operations such as machining, metal-working, and cleaning are required in the manufacture of the component part in addition to heat treatment, this invention contemplates use of our novel heat treatment operation or steps prior to such manufacturing operations. An aging operation may, in the case of component parts made of certain of the referenced precipitation-hardening steels treated in accordance with our invention, be required prior to intermediate manufacturing machining operations.

An important object of this invention is to provide a heat treatment which may be utilized to improve the ductility property of precipitation-hardening steel over the ductility obtained using previously-known heat treating methods.

Another object of this invention is to provide a heat treatment which may be utilized to improve the machinability characteristic of workpieces fabricated from precipitation-hardening alloy steel.

Another object of our invention is to provide a heat treatment which may be utilized to improve the dimensional stability characteristic of precipitation-hardening steel over that heretofore obtained in machined aircraft structural components and the like using conventional heat treating techniques.

A still further object of our invention is to provide a heat treatment which may be utilized to develop an improved resistance to corrosion capability in component parts manufactured of precipitation-hardening steel, especially as such quality relates to preferential etching encountered in manufacturing operations employing corrosion-causing media.

Another object of this invention is to provide a method which may be used to improve precipitation-hardening alloy steel mechanical properties other than transverse and longitudinal ductility.

Other objects and advantages of our invention will become apparent during consideration of the following descriptive material.

The heat treatment of this invention has application to precipitation-hardening steels. Such steels are characterized by their excellent resistance to corrosion and their responsiveness to heat treatments which include sub-zero cooling to develop optimum mechanical properties. Detail information with respect to corrosion-resistant alloys which respond to our heat treatment are provided in U.S. Letters Patent No. 2,799,602, granted July 16, 1957, and in Metals Handbook, 8th Edition, volume 1, published by American Society for Metals. With reference to the issued patent, precipitation-hardening steels generally fall within the composition range given at column 2, lines 50 through 59. Particular designations for material which responds to the heat treatment of our invention are provided in the referenced Metals Handbook at page 409 and include the wrought stainless steel alloys identified as AM-355, AM-350, PH 15-7 Mo, 17-7 PH, 17-4 PH, and Stainless W; the typical composition of each such precipitation-hardening steel is provided in Table 2 thereof. The descriptions provided herein with respect to our heat treatment relate, for the most part, to a heat treatment for AM-355 precipitation-hardening steel; some specific information, however, concerns application of the invention to PH 15-7 Mo and to other alloys. The typical analysis for AM-355 alloy steel referred to in this application was: 0.12% carbon, 15.5% chromium, 4.5% nickel, 2.85% molybdenum, 0.50% silicon, 0.85% manganese, 0.10% nitrogen, and the balance substantially iron. Incidental impurities included 0.04% phosphorous and 0.03% sulphur.

As used in this specification the term "conventional heat treatment" refers to heat treating methods wherein the precipitation-hardening steel material is processed using steps which include: (1) heating to a high temperature (generally 1675° F. to 2000° F.) for annealing or homogenizing purposes, and (2) cooling rapidly in air or by water quenching and the like to room temperature. Steps (1) and (2) are also referred to therein as a high-temperature anneal. In addition to such combined high-temperature heating and rapid cooling to room temperature, conventional heat treatment techniques for precipitation-hardening steel also include a subsequent process anneal step accompanied by transformation and aging steps. A process anneal is distinguished from the high-temperature anneal in that the annealing temperature may typically be in the range of 1700° F. to 1750° F.; transformation and aging involved sub-cooling at a temperature which may be as low as approximately —100° F. and aging in the range of 900° F. to 1050° F. Precipitation-hardening and tempering are generally accomplished by the aging step. The part is returned to room or ambient temperature as a part of or after each process anneal, transformation, and aging operation. The process anneal step is sometimes referred to as a "trigger anneal" and in the case of AM–350 material involves a temperature of approximately 1710° F. See the above-referenced Metals Handbook at pages 415 and 416 and the above-referenced U.S. Letters Patent for additional explanations regarding known heat treatments for precipitation-hardening steel. When machining, metalworking, acid cleaning, or similar operations are required in connection with the manufacture of precipitation-hardening alloy component parts, some materials are subjected to a process anneal at lower temperature, transformation, and aging group of steps after the high temperature anneal and prior to machining. These materials are typically aged (over-aged) at higher temperatures (1075° F). and normal process annealing, transformation, and aging steps as described above are employed subsequent to machining. After metal removal and cleaning operations and after process annealing and transformation steps, final aging is typically accomplished using a temperature such as approximately 900° F. without experiencing any loss of desired mechanical properties. Conventional heat treatments have also made use of an equalization step, such as holding at approximately 1375° F. to improve dimensional stability and machinability characteristics. However, such equalization step does not obtain the corrosion resistance and final mechanical properties developed through practice of our invention.

Our invention differs from known heat treatments for precipitation-hardening steels in that we employ a novel stabilization treatment which is in addition to the conventional high-temperature anneal, process anneal, transformation, and aging steps. The stabilization treatment utilized in the practice of our invention occurs subsequent to Step (2) referenced in the paragraph immediately above and prior to process anneal. In terms of AM–355 material, component parts are held at a temperature of 1590° F. for 30 minutes followed by an air quench to room temperature (if the cross-sections of the parts are small) or followed by water quench to room temperature (if larger cross-sections are involved). Such stabilization temperature is located below the range of normal process annealing temperatures for the alloy but above the temperatures associated with the starting of carbon migration to grain boundary regions. In terms of conventional stainless steel metallurgy, the stabilization temperature employed in our invention is just above the sensitizing range of the particular material. The stabilization temperature recognized by our invention is critical in nature; in the case of AM–355 it is the range of approximately 1600° F. ±25° F. and in the case of PH15–7 Mo alloy steel it is in the range of approximately 1525° F. ±25° F. Generally similar stabilization temperature ranges prevail for the other precipitation-hardening steels identified in this application.

The conventional heat treatment for precipitation-hardening steels operates to homogenize the alloy and produce a uniform grain chemistry at the high-temperature anneal thermal level to depress the $M_S$ to a point where the alloy is stable at room temperature. The process annealing and transformation (sub-cooling) operation portions of the conventional heat treatment for precipitation-hardening steels serve to transform conditioned austenite to martensite by lowering the material temperature to below the alloy $M_S$ value. As to our novel stabilization step in a heat treatment, we attempt to precipitate carbides in a dispersed manner rather than permit migration of carbon to grain boundiries in the alloy. This last treatment not only maintains the previously-achieved grain chemistry but prevents retention of austenite in localized areas after subsequent transformation of austenite to martensite and prevents a localization or concentration of austenite-retaining elements (e.g., carbon and chromium) at grain boundary regions.

The following examples are given to detail specific heat treatment steps which have been employed to obtain the advantages of this invention. The Example I steps relate to a method used in connection with heat treating to-be-machined aircraft structural components fabricated of AM–355 precipitation-hardening steel. Example II steps were used in connection with the heat treatment of PH15–7 Mo material fabricated into parts suitable for brazed honeycomb panel assemblies.

*Example I*

Step No. (1)—High temperature anneal at 1950° F. for one hour.
Step No. (2)—Air-cool (water quench in the case of large cross-sections) to room temperature.
Step No. (3)—Stabilization at 1590° F. for 30 minutes.
Step No. (4)—Air-cool (water quench in the case of large cross-sections) to room temperature.
Step No. (5)—Sub-cool at −100° F. for three hours.
Step No. (6)—Return to room temperature.
Step No. (7)—Age (over-age) at 1075° F. for 50 minutes.
Step No. (8)—Air-cool at room temperature.
Step No. (9)—Machine to dimension, acid clean, and perform similar intermediate manufacturing operations to extent required.
Step No. (10)—Process anneal at 1725° F. for 50 minutes.
Step No. (11)—Air-cool to 1000° F. within 30 minutes and to room temperature (water quench in the case of large cross-sections, if required).
Step No. (12)—Sub-cool at −100° F. for three hours.
Step No. (13)—Return to room temperature.
Step No. (14)—Age at 900° F. for three hours.
Step No. (15)—Air-cool to room temperature.

It should be noted that if no intermediate machining is required, Steps Nos. (7) through (9) may be omitted without sacrificing loss of improved ductility or dimensional stability or other mechanical properties and characteristics obtained from practice of the heat treatment of this invention. The times given above are times at temperature and do no include the time required to bring the heated alloy up to temperature.

*Example II*

Step No. (1)—High-temperature anneal at 1950° F. for 10 minutes.
Step No. (2)—Air-cool to room temperature.
Step No. (3)—Stabilization at 1525° F. for two hours.
Step No. (4)—Air-cool to room temperature.
Step No. (5)—Sub-cool at −100° F. for three hours.
Step No. (6)—Return to room temperature.
Step No. (7)—Process anneal at 1750° F. for 10 minutes.
Step No. (8)—Air-cool to 1000° F. within 30 minutes and to room room temperature.
Step No. (9)—Sub-cool at −100° F. for five hours.
Step No. (10)—Return to room temperature.
Step No. (11)—Age at 950° F. for one hour.
Step No. (12)—Air-cool to room temperature.

The PH15–7 Mo subjected to the above Example II heat treatment was used to fabricate aircraft parts that require no metal removal by machine tool operations. As indicated above, aging or over-aging is not required in the event machining of the parts to the dimension is not necessary. The times in temperatures given above are times at temperature and do not include any time required to bring the alloy component part up to temperature.

Information which supports the conclusion that the improved heat treatment of this invention obtains important results with respect to the ductility property of heat treated precipitation-hardening steel is presented in the following tables. Such information is based upon the analyses of numerous specimens taken from bars of AM-355 alloy which had external diameters of from approximately 4″ to 6″ or cross-sections up to approximately 3″ x 4½″. The distributions carried under the headings "Conventional Heat Treatment" relate to material which was subjected to a high-temperature anneal at 1875° F. for one hour, air-cooled to room temperature, equalized at 1375° F. for three hours, air-cooled to room temperature, sub-cooled at −100° F. for three hours, returned to room temperature, and over-aged at 1075° F. for three hours (such steps essentially comprised the previously-mentioned combined high-temperature anneal and equalization). The conventional heat treatment also included subsequently performed steps which involved process annealing at 1710° F. for one hour, air-cooled to room temperature, sub-cooled to −100° F. for three hours, return to room temperature, aged at 850° F. for three hours, and again returned to room temperature. The distribution information which is contained in the tables under the heading "Improved Heat Treatment" pertains to AM-355 material treated in accordance with our invention. The steps employed in connection with the improved heat treatment included a high-temperature anneal at 1950° F. for one hour, air-cooled to room temperature, stabilization at 1590° F. for 30 minutes, air-cool to room temperature, sub-cooled at −100° F. for three hours, and aged at 1075° F. for three hours (such steps constituting a high-temperature anneal, stabilization, and transformation and aging operation), and also include the subsequent steps of a process anneal at 1725° F. for one hour, air-cooled to room temperature, sub-cooled at −100° F. for three hours, and aged at 900° F. for three hours. Measurements with respect to reduction of area and elongation were made using standard techniques and using adjacent tensile samples taken from bar or billet. In the case of transverse reduction of area and transverse elongation, the tensile samples were adjacent or similarly located. The distribution data for the heat treated AM-355 material was as follows:

TABLE I

| Transverse Reduction of Area (Percent) | Conventional Heat Treatment | Improved Heat Treatment |
|---|---|---|
| Less than 5.1 | 13 | 4 |
| 5.1 to 10.0 | 14 | 3 |
| 10.1 to 15.0 | 13 | 3 |
| 15.1 to 20.0 | 3 | 5 |
| 20.1 and over | 13 | 41 |
| Total samples | 56 | 56 |

TABLE II

| Transverse Elongation (Percent in 2″) | Conventional Heat Treatment | Improved Heat Treatment |
|---|---|---|
| Less than 5.1 | 18 | 4 |
| 5.1 to 10.0 | 18 | 6 |
| 10.1 to 15.0 | 15 | 23 |
| 15.1 to 20.0 | 5 | 23 |
| 20.1 and over | 0 | 0 |
| Total samples | 56 | 56 |

From the above Tables I and II it is obvious that our improved heat treatment operates to obtain increased transverse ductility in comparison to the conventional heat treatment. From the standpoint of aircraft structural components, ductility minimums of 5% for transverse reduction of area and 5% for transverse elongation are commonly specified. Thus, practice of our invention will result in the rejection of fewer parts intended for aircraft structural component application. The savings to be realized from practice of the invention are considerable.

In the above distribution information, the presence of samples provided with the improved heat treatment in the transverse reduction of area and transverse elongation ranges of less than 5.0% is attributed to material which contained undesirable large inclusions in an excessive amount. Such determinations were made by analysis of photomicrographs of the material samples in question. It should be noted that the material precipitation-hardening alloy subjected both to the conventional and improved heat treatments was made both by air melt and consummable electrode inert atmosphere processes.

The information provided in the following Tables III and IV relate to longitudinal ductility in the heat treated AM-355 material. Some improvement in longitudinal ductility is obtained by our invention although such is recognized to be not as significant as that contained in transverse ductility properties.

TABLE III

| Longitudinal Reduction of Area (Percent) | Conventional Heat Treatment | Improved Heat Treatment |
|---|---|---|
| Less than 10.1 |  |  |
| 10.1 to 20.0 | 0 | 3 |
| 20.1 to 30.0 | 0 | 2 |
| 30.1 to 40.0 | 0 | 2 |
| 40.1 and over | 7 | 3 |
|  | 29 | 26 |
| Total samples | 36 | 36 |

TABLE IV

| Longitudinal Elongation (Percent in 2″) | Conventional Heat Treatment | Improved Heat Treatment |
|---|---|---|
| Less than 5.1 |  |  |
| 5.1 to 10.0 | 0 | 2 |
| 10.1 to 15.0 | 0 | 2 |
| 15.1 to 20.0 | 2 | 6 |
| 20.1 and over | 34 | 24 |
|  | 0 | 2 |
| Total samples | 36 | 36 |

Specification minimums for precipitation-hardening steel aircraft structural components typically require a yield strength value of 165,000 p.s.i. and a tensile (ultimate) strength value of 200,000 p.s.i. Of the samples which were free of large inclusions, none failed to attain the required yield strength and tensile strength levels. Typical transverse yield strength values for inclusion-free AM-355 parts heat treated in the improved manner range from approximately 171,200 p.s.i. to 183,400 p.s.i.; typical transverse tensile strength values (ultimate) range from 201,000 p.s.i. to 214,000 p.s.i.

The samples processed in accordance with the conventional heat treatment and in accordance with our improved heat treatment were analyzed qualitatively by visual inspection to obtain an evaluation of machinability and corrosion-resistance characteristics. Significant improvements were observed with respect to parts treated in accordance with the improved heat treatment. As to machinability, the preferred parts exhibited less smearing, provided a better as-machined finish, and aided cutter life. Improved corrosion resistance, particularly resistance to preferential etching, was observed in connection with component parts fabricated of precipitation-hardening steel and heat treated in accordance with our invention. Such was particularly true as to etching associated with intermediate manufacturing cleaning operations using conventional acid baths. Quantitative evaluations were made of dimensional stability and the heat treated parts processed in accordance with this invention exhibited a lack of growth due to processing subsequent to the initial high-temperature annealing and precipitation-hardening operations.

We claim:

1. A method of heat treating precipitation-hardening steel containing from about 0.03% to about 0.15% carbon, from about 12.0% to about 18.0% chromium, and from about 3.5% to about 7.0% nickel prior to process anneal, transformation, and aging operations, and which comprises the steps of:
(a) annealing said steel at a temperature which is above the minimum solutioning temperature of said steel to dissolve metal carbides within an austenite phase of said steel and then rapidly cooling said steel to ambient temperature,
(b) stabilizing said steel at a temperature which is in the range of approximately 1500° F. to approximately 1625° F. to disperse the carbon and carbide constituents of said steel uniformly in said steel austenite phase,
(c) and then rapidly cooling said steel ambient temperature to precipitate said carbon and carbide constituents within said steel, austenite phase in a uniformly dispersed manner, and
(d) sub-cooling said steel at a temperature which transforms a substantial portion of said steel austenite phase to martensite, said stabilizing step increasing the transverse ductility of said steel.

2. A method of improving the transverse ductility property of precipitation-hardening steel containing from about 0.03% to about 0.15% carbon, from about 12.0% to about 18.0% chromium, and from about 3.5% to about 7.0% nickel, and which comprises the steps of:
(a) heating said steel at an annealing temperature which is in the range of from approximately 1675° F. to approximately 2000° F. a sufficient time to provide contained austenite grains with a uniform grain chemistry and then rapidly cooling said steel to room temperature,
(b) stabilizing said steel by heating at a stabilization temperature which is below the temperature of approximately 1675° F. and which is above the maximum temperature in the sensitizing range of said steel a sufficient time to disperse the carbon and carbide constituents of said steel uniformly within said austenite grains,
(c) then rapidly cooling said steel to room temperature to precipitate said carbon and carbide constituents within said austenite grains in a uniformly dispersed manner,
(d) sub-cooling said stabilized steel at a temperature substantially below room temperature a sufficient time to transform a major portion of said contained austenite grains to martensite, and
(e) thereafter subjecting said steel to combined process annealing, transformation, and aging operations to develop optimum mechanical properties.

3. The method recited in claim 2, wherein said steel contains approximately 0.12% carbon, approximately 15.5% chromium, approximately 4.25% nickel, and approximately 2.85% molybdenum, and wherein said step (b) stabilization temperature is approximately 1600° F. ±25° F.

4. The method defined by claim 2, wherein said steel contains approximately 0.05% carbon, approximately 15.0% chromium, approximately 7.0% nickel, and approximately 2.25% molybdenum, and wherein said step (b) stabilization temperature is approximately 1525° F. ±25° F.

5. A method of manufacturing a component part fabricated of precipitation-hardening steel which contains from about 0.03% to about 0.15% carbon, from about 12.0% to about 18.0% chromium, and from about 3.5% to about 7.0% nickel and which requires machining to dimension and final heat treating to develop optimum mechanical properties, and comprising the steps of:
(a) heating said steel at an annealing temperature which is in the range of from approximately 1675° F. to approximately 2000° F. a sufficient time to provide contained austenite grains with a uniform grain chemistry and then rapidly cooling said steel to room temperature,
(b) stabilizing said steel by heating at a stabilization temperature which is below the temperature of approximately 1675° F. and which is above the maximum temperature in the sensitizing range of said steel a sufficient time to disperse the carbon and carbide constituents of said steel uniformly within said austenite grains,
(c) then rapidly cooling said steel to room temperature to precipitate said carbon and carbide constituents within said austenite grains in a uniformly dispersed manner,
(d) sub-cooling said stabilized steel at a temperature substantially below room temperature a sufficient time to transform a major portion of said contained austenite grains to martensite,
(e) aging said transformed steel at a temperature which develops increased hardness and improves machinability,
(f) machining said component part to dimension by removing metal therefrom, and
(g) thereafter subjecting said machined steel component part to final heat treating which includes process annealing, transformation, and aging operations to develop optimum mechanical properties.

6. A method of manufacturing a component part fabricated of precipitation-hardening steel which contains from about 0.03% to about 0.15% carbon, from about 12.0% to about 18.0% chromium, and from about 3.5% to about 7.0% nickel and which requires acid cleaning and final heat treating to develop optimum mechanical properties, and comprising the steps of:
(a) annealing said steel by heating at a temperature which is in the range of from approximately 1675° F. to approximately 2000° F. a sufficient time to provide contained austenite grains with a uniform grain chemistry and then rapidly cooling said steel to room temperature,
(b) stabilizing said steel by heating at a stabilization temperature which is below the temperature range of from approximately 1675° F. to approximately 2000° F. and which is above the maximum temperature in the sensitizing range of said steel a sufficient time to disperse the carbon and carbide constituents of said steel uniformly within said austenite grains,
(c) then rapidly cooling said steel to room temperature to precipitate said carbon and carbide constituents within said austenite grains in a uniformly dispersed manner,
(d) transforming said stabilized steel by sub-cooling at a temperature substantially below room temperature a sufficient time to change a major portion of said contained austenite grains to martensite,
(e) processing said component part in an acid-containing bath, and
(f) thereafter subjecting said cleaned steel component part to a process annealing operation and to final transformation and aging operations to develop optimum mechanical properties, said process annealed and transformed and aged component part being subjected to reduce preferential etching during step (e).

References Cited by the Examiner
UNITED STATES PATENTS

| | | | |
|---|---|---|---|
| 2,505,763 | 5/1950 | Goller | 75—124 |
| 2,799,602 | 6/1957 | Lena | 148—125 |
| 2,903,386 | 9/1959 | Waxweiler | 148—125 |

DAVID L. RECK, *Primary Examiner.*

RAY K. WINDHAM, *Examiner.*

W. B. NOLL, C. N. LOVELL, *Assistant Examiners.*